(12) United States Patent
McMichael et al.

(10) Patent No.: US 8,239,967 B2
(45) Date of Patent: Aug. 7, 2012

(54) SIMULTANEOUS TAMPER-PROOFING AND ANTI-PIRACY PROTECTION OF SOFTWARE

(75) Inventors: Lonny Dean McMichael, Fall City, WA (US); Boo Boon Khoo, Redmond, WA (US); Vito Joseph Sabella, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1241 days.

(21) Appl. No.: 12/014,596

(22) Filed: Jan. 15, 2008

(65) Prior Publication Data

US 2009/0183263 A1 Jul. 16, 2009

(51) Int. Cl.
*G06F 21/00* (2006.01)

(52) U.S. Cl. ............... 726/30; 726/33; 719/313
(58) Field of Classification Search ............... 726/30, 726/33; 719/313
See application file for complete search history.

(56) References Cited

U.S. PATENT DOCUMENTS

| | | | | |
|---|---|---|---|---|
| 6,006,328 | A | 12/1999 | Drake | 713/200 |
| 6,651,169 | B1 * | 11/2003 | Benson et al. | 713/193 |
| 7,133,845 | B1 | 11/2006 | Ginter | 705/51 |
| 7,171,558 | B1 * | 1/2007 | Mourad et al. | 713/168 |
| 7,243,340 | B2 | 7/2007 | Tobin | 717/130 |
| 2004/0123125 | A1 * | 6/2004 | Zuili | 713/193 |
| 2004/0181772 | A1 | 9/2004 | Pensak | 717/124 |
| 2004/0268134 | A1 | 12/2004 | Sasaki | 726/2 |
| 2005/0044359 | A1 | 2/2005 | Eriksson | 713/165 |
| 2005/0097133 | A1 * | 5/2005 | Pham et al. | 707/104.1 |
| 2006/0069653 | A1 | 3/2006 | Lelikov | 705/59 |
| 2006/0195906 | A1 | 8/2006 | Jin | 713/186 |
| 2006/0218539 | A1 | 9/2006 | Stiemens | 235/494 |
| 2007/0192252 | A1 | 8/2007 | Shear | 705/51 |
| 2007/0234430 | A1 | 10/2007 | Goldsmid | 713/190 |
| 2008/0288771 | A1 * | 11/2008 | Kulakowski et al. | 713/150 |
| 2009/0164779 | A1 * | 6/2009 | Yan et al. | 713/165 |

OTHER PUBLICATIONS

Piazzalunga et al. "Security Strength Measurement for Dongle-Protected Software," Nov./Dec. 2007 IEEE Security & Privacy.*
"Guarding Against Software Piracy, Source Code Theft and Tampering," V.I. *Laboratories Inc*, http://www.vilabs.com/docs/wp_CodeArmor.pdf, 2006, 7 pages.
"Protect Software Application," *IONWORX*, http://www.ionworx.com/serialshield.html, downloaded 2007, 1-2.
"Watermarking, Tamper-Proofing, and Obfuscation," http://www.cs.auckland.ac.nz/~cthombor/Pubs/tsewmtpobf/pdf, downloaded 2007, 1-31.

* cited by examiner

*Primary Examiner* — Kambiz Zand
*Assistant Examiner* — Michael Guirguis
(74) *Attorney, Agent, or Firm* — Woodcock Washburn LLP (57) ABSTRACT

Simultaneous tamper-proofing and anti-piracy protection of software is provided by splitting applications into two parts: an application, and an application launcher. The application is subject to the tamper-proofing protections deployed by a networked service, while the application launcher is subject to anti-piracy protections. To ensure that the application benefits from the anti-piracy protection of the application launcher, the application and application launcher share a trusted challenge-response relationship. The application includes a challenger library for issuing challenges to the application launcher, and the application launcher includes a responder library for responding to such challenges.

20 Claims, 6 Drawing Sheets

Outer Frame (Implemented in Application)  701
- Metadata pertaining to entire payload (packet size, etc.)

Base Frame (Implementation provided in Library)  702
- Base challenge/response data, processing of which protected with reverse-engineering techniques (e.g., obfuscation, individualization)

Inner Frame (Developer-Provided)  703
- Customized challenge/response data that may be tied in (on the launcher side) with the logic of the anti-piracy solution in use or (on the application side) with the logic of the application.

FIG. 7

SIMULTANEOUS TAMPER-PROOFING AND ANTI-PIRACY PROTECTION OF SOFTWARE

BACKGROUND

Tamper-proofing and anti-piracy technologies protect software in different ways, using different technological approaches. Tamper-proofing prevents would-be attackers from hacking software by, for example, discovering how the software works, and then spoofing or preventing certain software operations in order to produce a result other than that intended by the original developer. For example, an attacker may wish to tamper with videogame software in order to cheat in online gaming. By discovering how the videogame software and online service function, the attacker could theoretically cheat by causing the software of, e.g., the game, game console, or online service, to give him certain advantages over other players connected to the online service.

Tamper-proofing technologies that protect against such attacks include anti-debugging and module authentication technologies. Anti-debugging technologies prevent would-be attackers from running a debugger while the protected software is executing. Module authentication technologies prevent runtime modification of code pages.

Anti-piracy technologies, on the other hand, prevent copyright infringement by preventing unauthorized persons from making and distributing unauthorized copies of software. Copyright infringement of digital works such as software and digital pictures, music, and videos is rampant due to the low cost of making unauthorized copies, and the easy distribution of such copies on the Internet.

Anti-piracy technologies may, for example, attempt to tie a copy of software existing on a computer hard drive to a physical medium such as a Digital Versatile Disk (DVD), thereby requiring a computer executing the software to have physical access to a certified copy of the software. Anti-piracy technologies may also use a so-called activation model, whereby the application is associated with a unique value (e.g., a 5×5 product key), that may only be used once, or a limited number of times. This model requires connectivity to a server (e.g., over the internet) that validates and maintains the association of the activated product keys. Activation-based schemes are often used for digital distribution of video games. For example the ACTIVEMARK® product made by MACROVISION® is an example of an activation-based technology. Furthermore, anti-piracy technologies may utilize code pages in an executing process (i.e., as part of the executable/DLL), but in an encrypted form. Anti-piracy code decrypts those code pages before they're needed—perhaps during the application's initialization, or alternatively, in a "just in time" fashion (e.g., when a particular protected subroutine is invoked). The protected code is thus not available "in the clear" in a form easily accessible by an attacker (e.g., in unencrypted form on the hard disk or CD/DVD). Finally, anti-piracy technology may also attach to a process during runtime much like a debugger, to prevent reverse-engineering for the purpose of removing protections and copying the copyrighted content. Some other anti-piracy products include SAFEDISK®, made by MACROVISION®, and SECUROM®, made by SONY DADC®.

When tamper-proofing and anti-piracy technologies operate simultaneously, the anti-piracy technologies may trip the tamper-proofing (anti-debugging and module authentication) technologies. The result is that simultaneous execution of the technologies can lead to conflicts that degrade performance and stymie interoperability with varying degrees of seriousness depending on the extent of incompatibility. In order to achieve adequate software security in many scenarios, what is needed are systems, methods, and computer readable media for improving simultaneous tamper-proofing and anti-piracy protection of software.

SUMMARY

In consideration of the above-identified shortcomings of the art, the present invention provides systems and methods for allowing simultaneous tamper-proofing and anti-piracy protection of software. In one embodiment, a system is provided that includes a networked service, such as an online video gaming service, that interacts with software applications, such as video games. The networked service requires tamper-proofing protections for the software applications that interact with it. Meanwhile, the software applications are protected using anti-piracy protections on the client device. The tamper proofing and anti-piracy protections are simultaneously accommodated by implementing the software applications in two parts: an application, and an application launcher. The application is subject to the tamper-proofing protections of the networked service, while the application launcher is subject to anti-piracy protections. To ensure that the application benefits from the anti-piracy protection of the application launcher, the application and application launcher share a trusted challenge-response relationship. The application includes a challenger library for issuing challenges to the application launcher, and the application launcher includes a responder library for responding to such challenges. Other advantages and features of the invention are described below.

BRIEF DESCRIPTION OF THE DRAWINGS

The systems and methods for simultaneous tamper-proofing and anti-piracy protection of software in accordance with the present invention are further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 1:
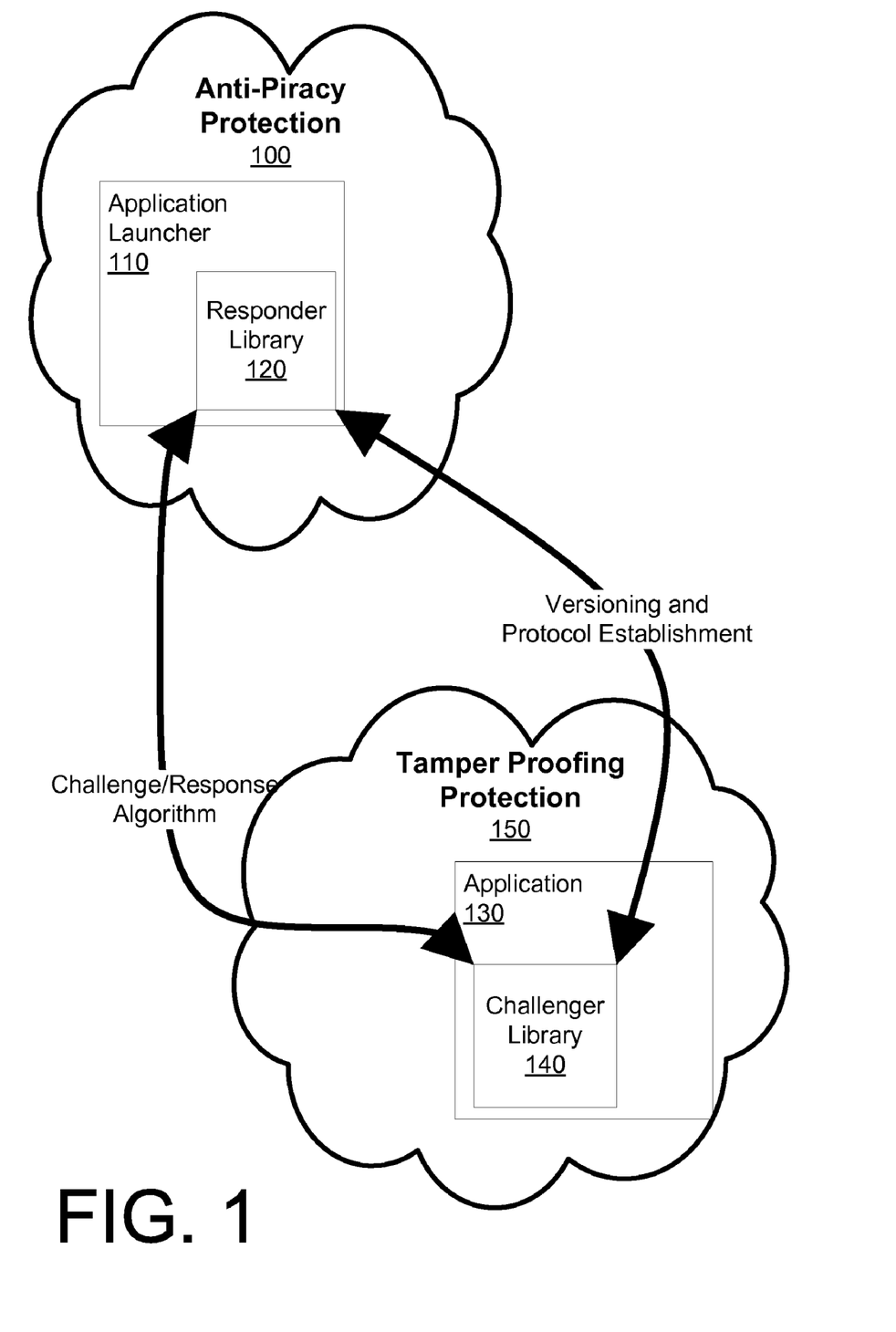
FIG. 1 illustrates an application and application launcher comprising respective challenger and responder libraries.

FIG. 1 illustrates an application 130 comprising a challenger library 140 and an application launcher 110 comprising a responder library 120. The application 130 is subject to tamper-proofing protection 150 and the application launcher 110 is subject to anti-piracy protection 100.

Because of communications between the application 130 and the application launcher 110, the anti-piracy protection 100 of the launcher 110 effectively protects against piracy of application 130 as well, without tripping the tamper-proofing protection 150. This is because the application 130 is configured via challenger library 140 to verify appropriate operation of the launcher 110. Launcher 110 is configured to use responder library 120 in generating responses to challenges from application 130. If the application launcher 110 fails, then launcher 110 will no longer be able to respond to challenges. Launcher 110 may fail, for example, because it is terminated by anti-piracy protection 100, e.g., when anti-piracy protection 100 discovers that application launcher 110 is not appropriately licensed. In another embodiment, launcher 110 may fail by "non-fatal" modification, in which launcher 110 for example delivers incorrect results to subsequent challenges. This results in a solution that is more difficult for an attacker to crack, as the point of failure is much more difficult to ascertain.

Application 130 will eventually recognize a failure to respond. Application 130 can voluntary disable itself, degrade its performance, or otherwise respond to such failure. In this manner, anti-piracy protection of application 130 is effectively achieved, without tripping the tamper-proofing protections 150 directed to the application 130.

In one exemplary embodiment, the application 130, challenger 140, application launcher 110, and responder 120 are implemented via computer software comprising a plurality of computer executable instructions stored on a computer readable medium. The software carries out processes that execute on a client computer, such as a gaming console, personal computer, or handheld device.

Anti-piracy protection 100 may also be implemented via software, and may in one embodiment be stored on a same computer readable medium as the application 130 and application launcher 110. For example, if a video game application and video game launcher are distributed on a computer readable medium such as a Digital Versatile Disk (DVD), anti-piracy software as desired by the game developer may also be recorded onto the same DVD, in such a manner that the game application is protected by the anti-piracy software when the game application is executed on the client device.

Tamper-proofing protection 150 may also be implemented via software. It will be appreciated that software for tamper-proofing protection 150 could also execute locally on the same client as executes application 140, launcher 110, and anti-piracy 100. In a preferred embodiment, tamper-proofing protection 150 interoperates with a networked service, such as an online gaming service. The networked service can, for example, require tamper-proofing to be in place to prevent misuse of the service, e.g., cheating in an online multiplayer video game, or otherwise reverse engineering and interacting with an online service in a manner that was not intended by the provider of the service.

It will be appreciated that the decision regarding what aspects of tamper-proofing protection 150 to execute on the client and what to execute on a server associated with the networked service is a matter of design and that the nature of electronics allows software to be deployed at any number of locations. In one embodiment, tamper-proofing protection 150 comprises a combination of software that executes on a same client device as application 130, and corresponding software that executes at a networked service (not shown) to which the client device is communicatively coupled. The tamper-proofing protection 150 is activated and controlled by the networked service, which can cause corresponding software on the client to perform operations as necessary to prevent tampering.

In one embodiment, the launcher 110 can be configured as a "ripple launcher." The launcher 110 is responsible for launching a second binary comprising the application 130, and the application 130 can be configured to implement binaries specifically designed to interact with a networked service, and to implement the various protections required by the networked service. A chain of trust between the launcher 110 binary and the application 130 binary is established through a challenge-response system, as described in greater detail below.

Figure 2:
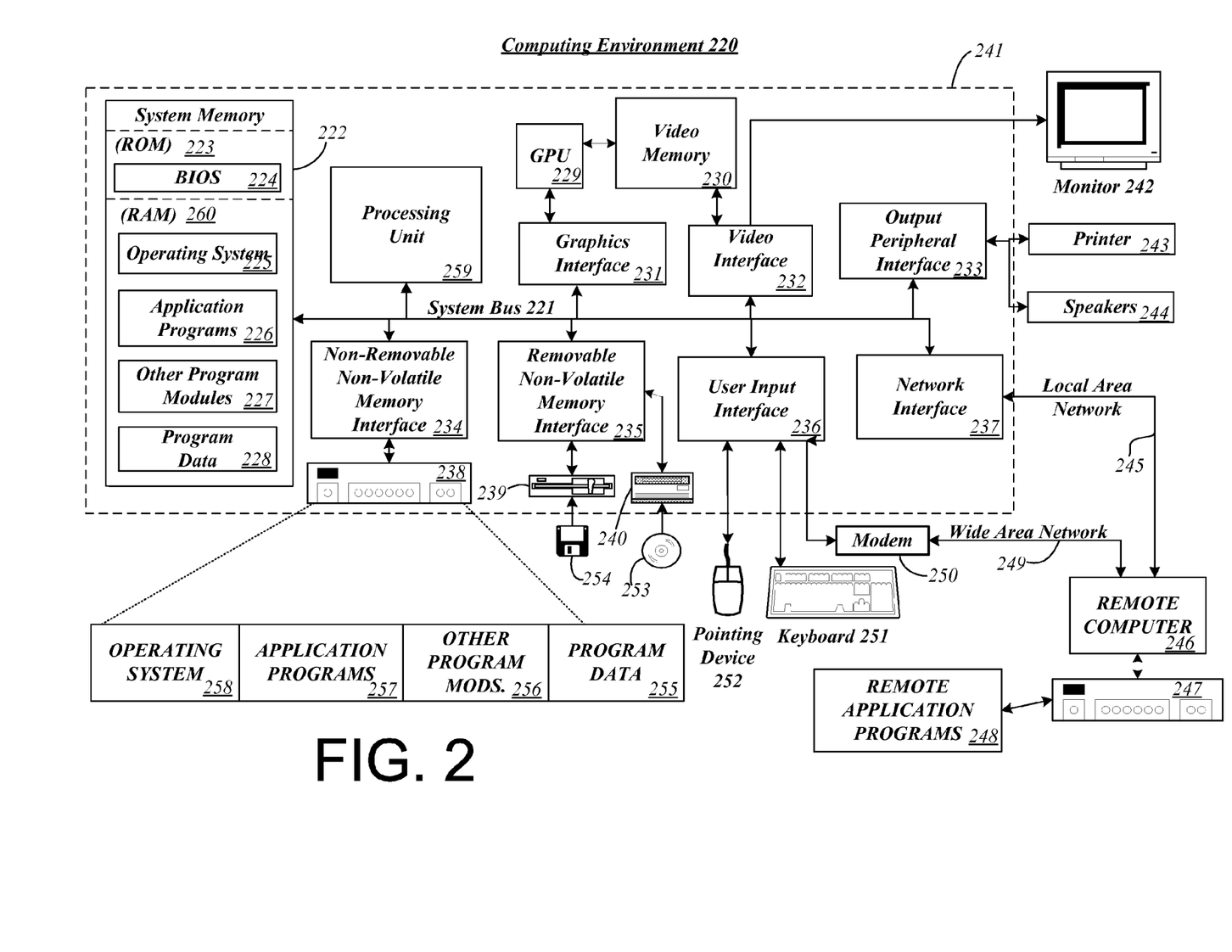
FIG. 2 illustrates a computer as may execute an application and application launcher and connect with a networked service.

FIG. 2 illustrates a suitable computing device for executing application 130 and other software as described above. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be implemented in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media.

Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 2 illustrates operating system 225, application programs 226, other program modules 227, and program data 228.

The computer 241 may also include other removable/non-removable, volatile/nonvolatile computer storage media. By way of example only, FIG. 2 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 2, provide storage of computer readable instructions, data structures, program modules and other data for the computer 241. In FIG. 2, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies.

A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 2. The logical connections depicted in FIG. 2 include a local area network (LAN) 245 and a wide area network (WAN) 249, but may also include other networks. Such networking environments are commonplace in offices, enterprise-wide computer networks, intranets and the Internet. The computer 241 may thus connect to a networked service such as an online gaming service via such network connections.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 2 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program (s) can be implemented in assembly or machine language, if desired. In any case, the language may be a compiled or interpreted language, and combined with hardware implementations.

Although exemplary embodiments refer to utilizing the present invention in the context of one or more stand-alone computer systems, the invention is not so limited, but rather may be implemented in connection with any computing environment, such as a network or distributed computing environment. Still further, the present invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 3:
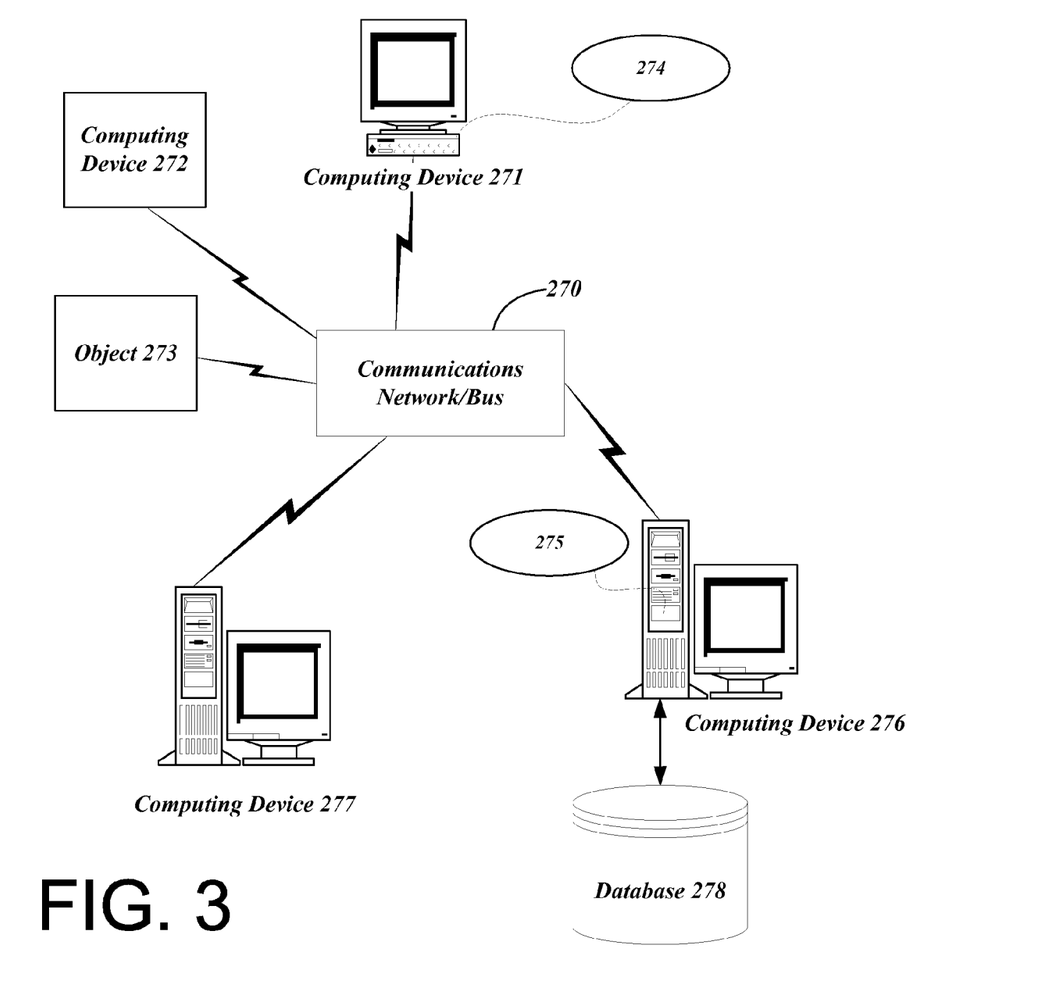
FIG. 3 illustrates a computing network as may be used to implement a networked service.

An exemplary networked computing environment as may be utilized in providing a connection a client computer that executes application 130 and an networked service that requires tamper-proofing is provided in FIG. 3. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 3 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2c, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In a client/server architecture, particularly a networked system, a client is usually a computer that accesses shared network resources provided by another computer, e.g., a server. In the example of FIG. 3, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Figure 4:
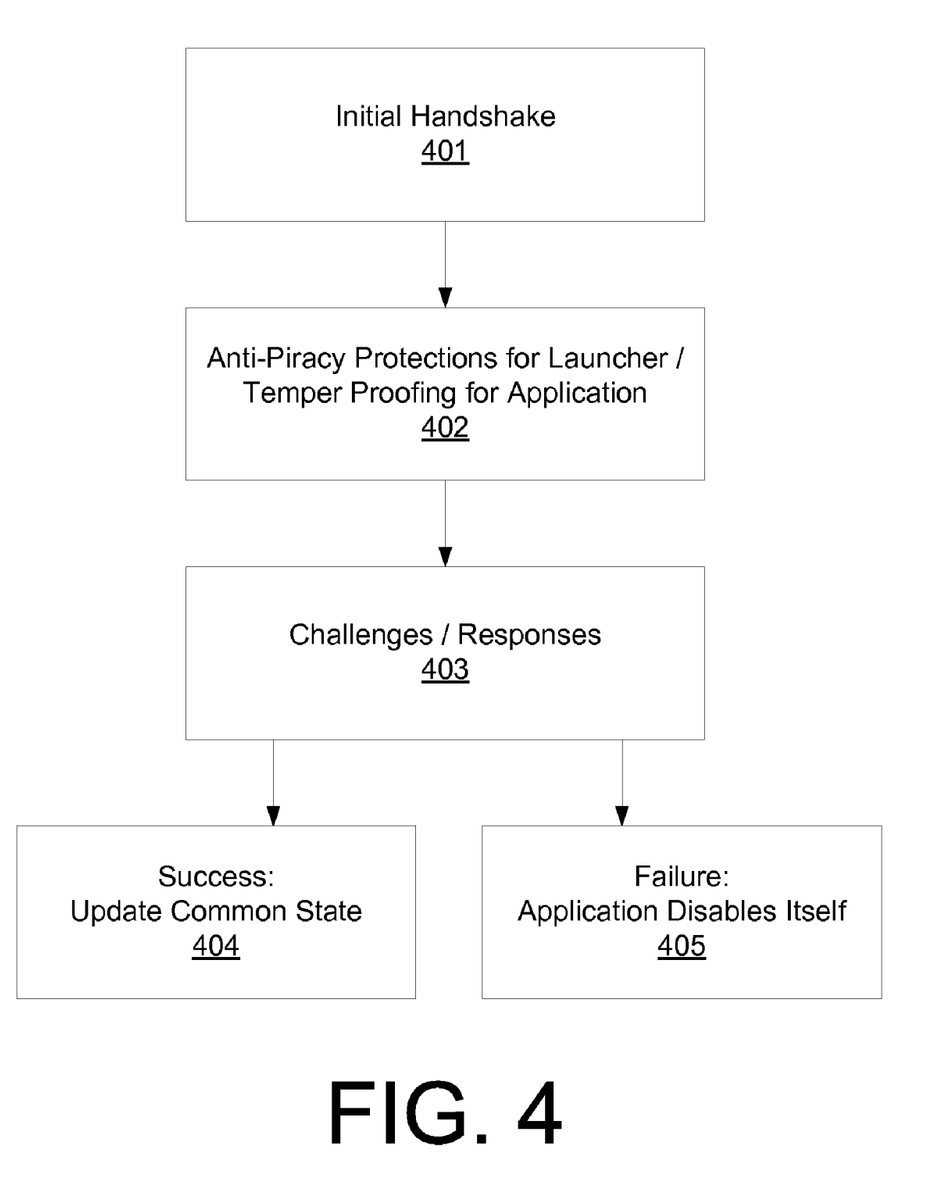
FIG. 4 illustrates exemplary method steps as may be carried out between an application and application launcher.

FIG. 4 illustrates exemplary method steps as may be carried out between an application 130 and application launcher 110 as illustrated in FIG. 1. The steps of FIG. 4 establish a secure, tamper-resistant tie between the two processes 110, 130, allowing application 130 to ensure that the copyright protected process 110 is executing properly, or if not, to respond appropriately.

On startup, in step 401, any anti-piracy protections may be started and directed at the launcher 110, and any anti-tampering protections may be started and directed at the application 130.

As illustrated in step 402, the two processes 110, 130, establish a common state via a handshake protocol based on a shared secret. The shared secret can be any of a wide variety of data as will be appreciated. For example, it may be a password-like string. The initial handshake and establishment of a shared secret may, in one embodiment, be done in such a way that there is variability in behavior between different launches of the process, in order to thwart replay attacks.

The two co-dependent processes 110, 130, then maintain a trusted relationship via a challenge-response system 403. The challenging process (application 130) periodically verifies the existence of the responding process (launcher 110) by sending a challenge based on a current state of the application 130. The challenges are generated using library 140. The term "periodically" is used here to mean at different times during the execution of said software application 130, and does not imply that challenges are necessarily produced at regular time intervals. The challenges are preferably generated at unpredictable times throughout the execution of the application. This may be achieved by including instructions for issuing challenges at various places in the application code.

The launcher 110 receives the challenges, and uses library 120 to generate responses. Upon a successful response, a common state of 110, 130 is updated appropriately 404. For example, the launcher 110 may include instructions for responding to a first challenge, and for updating a state of said software application launcher to prepare for responding to a next challenge.

If a response is ever incorrect or not delivered in a timely manner, the application 130 can react by disabling itself 405 in any number of ways. For example, the application 130 may include instructions for disabling itself, comprising, for example, either instructions for immediately exiting, or instructions for partially disabling itself to negatively affect user experience, without terminating said software application.

Figure 5:
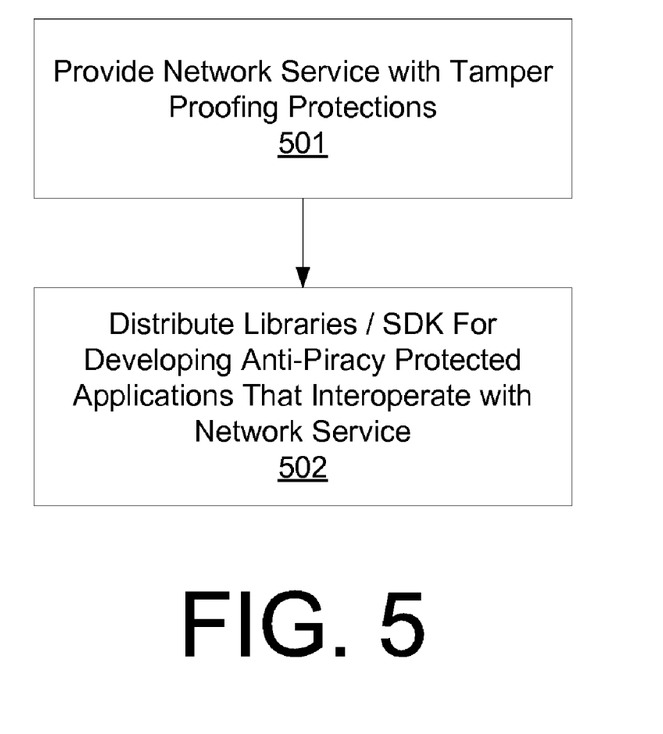
FIG. 5 illustrates a method comprising providing a networked service with tamper proofing protections, and distributing libraries and/or software development kits for creating anti-piracy protected applications that interoperate with the networked service.

FIG. 5 illustrates a method for simultaneous tamper-proofing and anti-piracy protection of software as may be implemented in one embodiment. A network service with tamper-proofing protections may be provided 501. For example, the XBOX LIVE® or GAMES FOR WINDOWS-LIVE® service provided by Microsoft Corp. is one example of such a service. Developers of applications, e.g., games, that interact with the service may then be supported through distribution 502 of libraries such as 120, 140 from FIG. 1. These libraries may, for example, be incorporated in a Software Development Kit (SDK) that also provides other assistance in developing appropriate applications that interact with the networked service.

Figure 6:
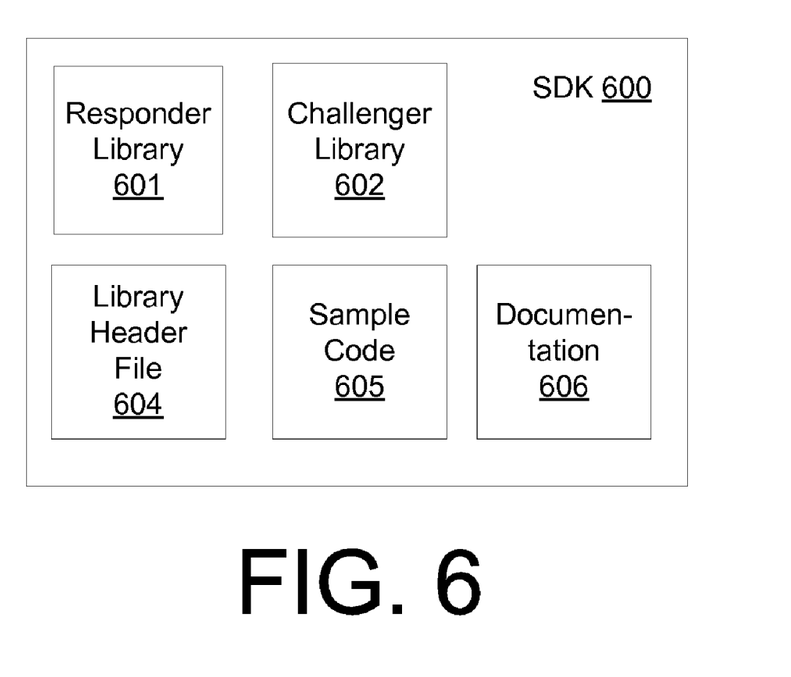
FIG. 6 illustrates an exemplary Software Development Kit (SDK) as may be distributed to facilitate development of anti-piracy protected applications and application launchers that interoperate with a networked service that provides tamper-proofing protections.

FIG. 6 illustrates exemplary aspects of an SDK 600. The SDK 600 comprises: at least one library 601 and/or 602, which can be linked into both launcher and game executables; a library header file 604, providing the definitions needed to use the library 601, 602; sample code 605 illustrating how to use the library 601, 602; and documentation 606.

The at least one library may include one library that is designed to perform all necessary and advantageous library functions or, e.g., a pair of libraries 601 and 602 may be provided. When libraries 601 and 602 are deployed as a single library, such library would comprise all functions that would be used in both the challenging and responding processes. The single library is then incorporated into both the challenging and responding processes.

The challenger library 602 can be integrated by an application developer into various choke points within an application binary. During runtime, the application binary checks for the presence of a functional, copyright protected, launcher at those points. Appropriate instructions for integrating said challenger library 602 into a software application can also be provided.

The responder library 601 can be integrated into the launcher binary, whose purpose is to respond to challenges sent by the application, thereby proving that the anti-piracy protected launcher is still operating. Appropriate instructions for providing developer information for integrating said responder library into a launcher corresponding to said software application can also be provided. Mechanisms and/or developer instructions for tying the responder 601 into anti-piracy logic may be provided, so the responder 601 does not respond correctly if the anti-piracy protection mechanism has been compromised in some way.

In one embodiment, at launch time, the binary corresponding to the responder library 601 in the launcher establishes a conduit, such as a set of shared memory addresses, a named pipe, or the like, with the binary corresponding to the challenger library 602. The binary corresponding to the responder library 601 then waits for challenges from the application, and responds to them as provided above. If the application launches and it does not receive correct responses from the responder, then it exits or otherwise disables itself.

In one embodiment, the libraries 601 and 602 implement a challenge/response mechanism which is difficult to reverse engineer, based on computationally difficult problems, obfuscation, and uniqueness. The libraries 601 and 602, through the challenge/response mechanism, have the ability to mutually authenticate.

In one embodiment, library pairs 601 and 602 individualized per-application title, such as providing unique library pairs 601 and 602 in each SDK 600 that is distributed to an application developer. Library pairs 601 and 602 can be individualized, for example, by using random seed information that is compiled in to the binary. This secret is shared between the challenger and responder libraries 601 and 602, and is used to establish a shared state between them that is used as the basis of the challenges and responses.

The source-provided portions of libraries 601 and 602 can have the appropriate integration points for appropriately directing anti-piracy protections to the launcher. In one embodiment, the launcher process to be developed by the application developer is protected with the developer's anti-piracy technology of choice, e.g. from the developer's preferred vendor of such technology. For optimum strength, the anti-piracy solution should implement some form of anti-lift protection.

Documentation 606 and sample code 605 can in general provide examples and instructions for the use of the library (ies) 601 and 602. In one embodiment, documentation 606 and sample code 605 can define concepts and data structures and the corresponding code for a "base frame", "outer frame", and "inner frame" that may be used in conjunction with the library(ies) 601 and 602. For example, the source-provided portion of the SDK 600 advantageously contains sample code to illustrate how developers can construct and use base, outer and inner frames, leaving the developer to be responsible for creating the actual data structures and code to be used for their particular implementation.

Figure 7:
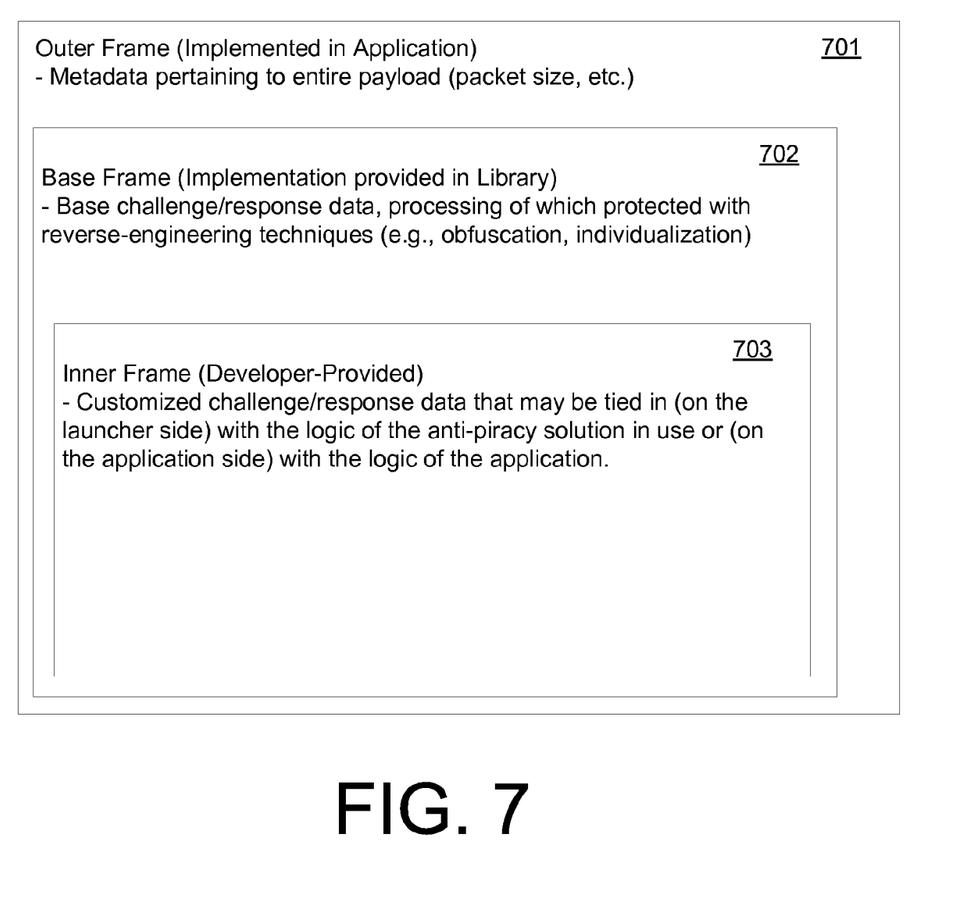
FIG. 7 illustrates an exemplary outer frame/base frame/inner frame arrangement which may be utilized in connection in various embodiments.

The base frame 702, outer frame 701, and inner frame 703 are illustrated in FIG. 7. The base frame 702 may comprise a standard challenge based on the shared secret indicated above. However, the provided APIs can advantageously directly support the ability for developers to add customized challenges or data.

The outer frame 701 may contain the entirety of the challenge or response packet (i.e., the base frame plus the embedded inner frame, if any). In addition, it may include a header that provides metadata pertaining to the packet (e.g., its size, etc.). At the outer frame level, this is also the developer's opportunity to apply obfuscation/encryption onto the entire payload (in addition to whatever obfuscation/encryption might be employed on the base and/or inner frames). The outer frame 701 can contain the basic functionality for setting up a non-customized set of challenges in the application.

The inner frame 703 can be customized by each application title. This customization can take the form of additional challenges, or data that may be used to affect the application in some way, e.g. modifying application state in a negative way when piracy is detected.

In one exemplary use of the frames 701-703, referring to FIG. 7, an application 130 (such as a video game) can include code that processes the outer frame 701. The application 130 passes an embedded base frame 702 to the library (e.g. the challenger library 602). The library 602 processes base frame 702. The library 602 then passes an embedded inner frame 703 to a callback routine supplied by application 130. The developer-provided callback then processes the inner frame 703. By this mechanism, customization of the challenge/response mechanism can be tied into base challenge/response behavior provided by the library(ies) 601, 602.

The SDK 600 can provide developer tools and information as desired for facilitating development of applications using the simultaneous tamper proofing and anti-piracy approach provided herein. For example, documentation 606 and sample code 605 may comprise a general explanation of how to implement the simultaneous tamper proofing and anti-piracy. Documentation 606 and sample code 605 may further provide instructions and software tools for integrating libraries 601 and 602 into application and launcher software.

Documentation 606 and sample code 605 may further provide instructions for providing developer information for disabling said software application when a response to a challenge is not received from said launcher. This may include strategies for intelligent application disabling in the event of a piracy detection. For example, a game developer may be educated regarding the merits of degrading game performance, such as by neglecting certain user commands, erratically changing settings and parameters such as player strength and weapons, or progressively disabling certain aspects of game software. This approach to disabling can be preferable, because it stymies reverse engineering of the system used for protecting the application.

Documentation 606 and sample code 605 may also provide instructions for protecting said software application from piracy by protecting said launcher using anti-piracy software. This may include, for example, instructions for integrating anti-piracy technologies with the launcher. Documentation 606 and sample code 605 may further provide instructions for using and customizing the various frames 701-703 described above.

In light of the diverse computing environments that may be built and the further diversification that can occur in computing in a network environment the systems and methods provided herein cannot be construed as limited in any way to a particular computing architecture. Instead, the present invention should not be limited to any single embodiment, but rather should be construed in breadth and scope in accordance with the appended claims.

The invention claimed is:

1. A computer readable storage medium that is not a transient signal, the computer readable storage medium having computer executable instructions, comprising:
   instructions for a software application launcher that includes anti-piracy protection;
   instructions for a corresponding software application that includes tamper proofing protection;
   instructions for generating a plurality of challenges from said software application to said software application launcher to ensure that said software application benefits from the anti-piracy protection in said software application launcher, each of said plurality of challenges being generated at a different time during the execution of said software application with tamper proofing protection in operation;
   instructions for generating a corresponding plurality of responses to said plurality of challenges, the plurality of responses directed at proving that anti-piracy protection is operating in said software application launcher while said tamper proofing protection is operating in said software application; and
   instructions for disabling said software application when a correct response is not timely received from said software application launcher.

2. The computer readable storage medium of claim 1, wherein said anti-piracy protection comprises instructions for anti-lift protection.

3. The computer readable storage medium of claim 1, wherein said instructions for generating a plurality of challenges comprise instructions for using a challenger library.

4. The computer readable storage medium of claim 3, wherein said instructions for generating said corresponding plurality of responses to said plurality of challenges comprise instructions for using a responder library that is different than the challenger library.

5. The computer readable storage medium of claim 4, said software application launcher further comprising instructions for establishing a conduit between a first binary corresponding to the responder library and a second binary corresponding to the challenger library.

6. The computer readable storage medium of claim 1, said instructions for generating a plurality of challenges comprising customized inner frame instructions that are unique to said software application.

7. The computer readable storage medium of claim 1, wherein said instructions for generating said corresponding plurality of responses comprise instructions for generating at least one incorrect response.

8. The computer readable storage medium of claim 1, wherein said software application is a video game application.

9. The computer readable storage medium of claim 8, wherein said video game application interoperates with an online gaming service.

10. The computer readable storage medium of claim 9, wherein said online gaming service provides anti-debugging and module authentication tamper-proofing protections.

11. A computer readable storage medium that is not a signal, the computer readable storage medium having computer executable instructions for a software development kit, comprising:
   at least one library comprising challenger functions and responder functions;

said at least one library configurable for integrating into a software application that includes tamper proofing protection, wherein said software application with said at least one library integrated thereto, is operative to generate and transmit challenges to a corresponding software application launcher that includes anti-piracy protection; and said at least one library further configurable for integrating into said software application launcher, wherein said software application launcher with said at least one library integrated thereto, is operative to generate responses to said challenges, the responses directed at proving to said software application that anti-piracy protection is operating in said software application launcher while tamper proofing protection is in operation in said software application.

12. The computer readable storage medium of claim 11, wherein said library in said launcher is configured to establish communications with said library in said software application by establishing a conduit for communication with said library in said software application.

13. The computer readable storage medium of claim 11, wherein said instructions for integrating said at least one library into said software application comprise instructions for utilizing an outer frame, base frame, and inner frame.

14. The computer readable storage medium of claim 11, wherein said at least one library in said software application launcher comprises instructions for generating at least one incorrect response.

15. The computer readable storage medium of claim 11, further comprising instructions for establishing a shared secret between said challenger library and said responder library.

16. The computer readable storage medium of claim 11, wherein said software application is a video game application.

17. The computer readable storage medium of claim 16, wherein said video game application interoperates with an online gaming service.

18. The computer readable storage medium of claim 17, wherein said online gaming service provides anti-debugging and module authentication tamper-proofing protections.

19. A method for simultaneous tamper-proofing and anti-piracy protection of software, comprising:
    providing a networked service that interacts with software applications, said networked service requiring tamper-proofing protections for said software applications, said tamper-proofing protections comprising one or more of anti-debugger protection and module authentication protection;
    distributing a Software Development Kit (SDK) for developing an application that interacts with said networked service, said application including tamper proofing protection;
    said SDK comprising at least one library that is configurable for integration into an application launcher that includes anti-piracy protection; and
    said at least one library comprising challenger functions for insertion into said application, and responder functions for insertion into said application launcher, the challenger and responder functions operable to ensure that said anti-piracy protection is operating in said application launcher while said tamper proofing protection is operating in said application.

20. The method of claim 19, wherein said at least one library is unique to said SDK.

* * * * *